ELECTRONIC COMPUTER WITH ABBREVIATED ADDRESSING OF DATA

Filed April 6, 1962 3 Sheets-Sheet 1

INVENTORS
GIORGIO SACERDOTI
OTTAVIO GUARRACINO
BY Kenyon & Kenyon
ATTORNEYS

INVENTORS
GIORGIO SACERDOTI
OTTAVIO GUARRACINO
BY [signature]
ATTORNEYS

ELECTRONIC COMPUTER WITH ABBREVIATED ADDRESSING OF DATA

Filed April 6, 1962 3 Sheets-Sheet 3

INVENTORS
GIORGIO SACERDOTI
OTTAVIO GUARRACINO
BY Kenyon & Kenyon
ATTORNEYS

United States Patent Office 3,223,982

Patented Dec. 14, 1965

3,223,982

ELECTRONIC COMPUTER WITH ABBREVIATED ADDRESSING OF DATA

Giorgio Sacerdoti, Rome, and Ottavio Guarracino, Milan, Italy, assignors to Ing. C. Olivetti & C., S.p.A., Ivrea, Italy, a corporation of Italy Filed Apr. 6, 1962, Ser. No. 185,633

2 Claims. (Cl. 340—172.5)

Figure 1:
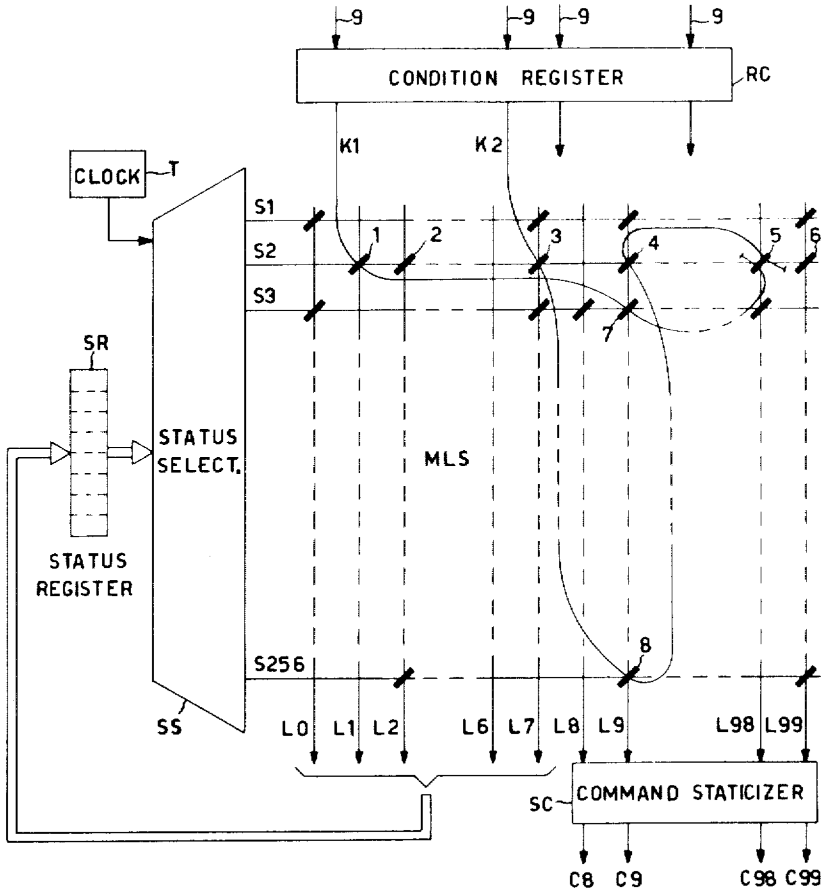

The present invention relates to an electronic computer adapted to perform operations on operands which are stored in a main store and which may be addressed by means of an effective address including a plurality of decimal digits, said computer being controlled by instructions indicating each one the explicit address of an operand and the operation to be performed on it.

An electronic computer is generally controlled by suitable instructions which as a whole form a program, said program being stored for instance in a main store together with the data to be processed.

An instruction comprises generally an operation part, which indicates to the computer the operation to be performed and an instruction part, which indicates to the computer the address of the section of the store containing the datum or operand, whereon the operation has to be performed.

To store in the main store a great deal of instructions and data organized in words having a constant length makes large and therefore expensive main stores necessary.

It is known that this difficulty may be partly overcome by organizing the data in words having a variable length instead of a constant length equal to the maximum required length, the instructions maintaining, however, a constant length. Thus, for example in the case of numerical data, the representation of each number may be shortened by eliminating the non-significant zeroes, provided a separating symbol is interposed between each pair of contiguous numbers.

Some known computers are controlled by instructions formed of a word having a certain constant length to control certain operations and by instructions formed of either two or more words grouped for controlling more complex operations.

This allows further space to be saved in the main store. However, the instruction corresponding to each type of operation still has a constant length as usual.

Furthermore, an electronic computer is known wherein it is possible to omit the address part in some instructions, which therefore are reduced to their operation part.

This enables further spaces to be saved in the main store, and, moreover, the time for preparing and interpreting the instructions to be reduced. In said computer, the address omitted in an instruction to be elaborated is intended to be equal to the address of the operand which in the main store is contiguous to the operand indicated in the next preceding instruction, said address being obtained by a suitable counting register.

Consequently, such abbreviated instructions may be used only in the case where a series of contiguous operands has to be operated upon. By contrast, in the general case wherein a series of non-contiguous operands has to be operated upon, it is necessary to explicitly indicate in each instruction the whole address of the corresponding operand.

A considerable reduction in the length of the program and in its execution time is obtained by the electronic computer according to the present invention, which is adapted to perform operations on operands stored in a main store and addressable by means of an effective address including a plurality of decimal digits, said computer being controlled through instructions indicating each one the explicit address of an operand and the operation to be performed on it, and being characterized in that the effective address of an operand is obtained by substituting the digits of the corresponding explicit address for the corresponding digits of the effective address of the last addressed operand, whereby in each instruction it is sufficient to make explicit that part of the effective address which differs from the effective address of the preceding operand.

Figure 2A:
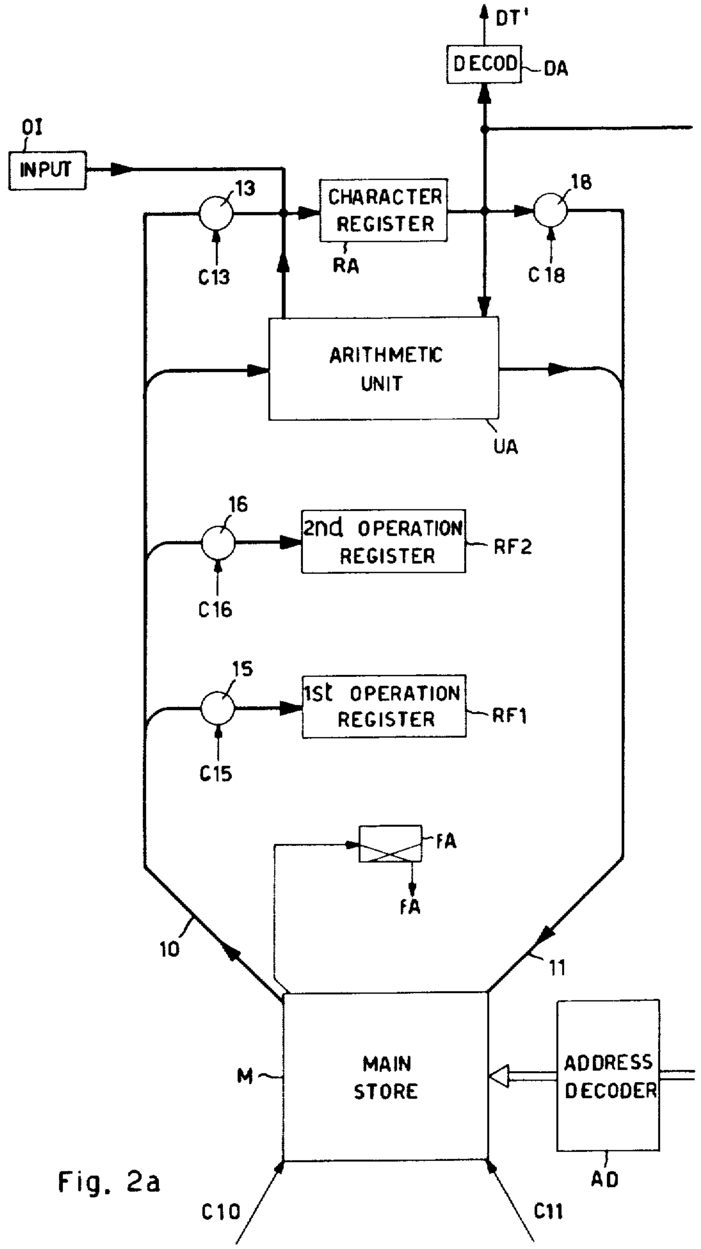
Figure 2B:
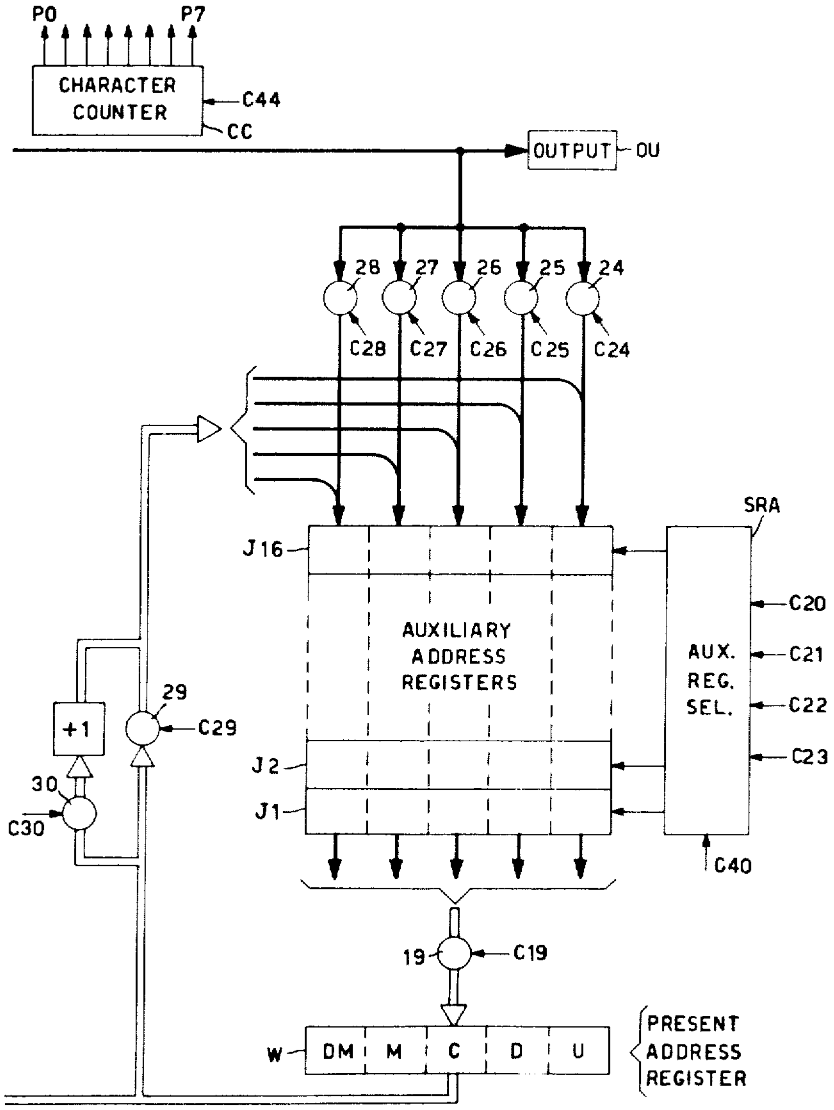
Figure 3:
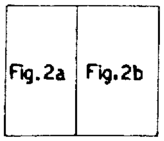

This and other features of the invention will become apparent from the following description of a preferred embodiment thereof, taken in conjunction with the accompanying drawings, in which FIG. 1 shows a circuit diagram of the sequencing matrix of the computer;

FIGS. 2*a* and 2*b* show a block diagram of a part of the computer;

FIG. 3 shows how FIGS. 2*a* and 2*b* are to be composed.

In the figures, the thin, the thick and the double lines represent paths for one bit, a character of four bits in parallel and a group of five characters or number of five decimal digits, respectively.

The program instructions and the data or operands to be processed according to the program are stored in a main store of the random access type M, comprising $10^5$ cells. Each cell may be addressed by means of an address including five decimal digits, and is adapted to store a character.

Each instruction as well as each operand comprises a plurality of characters, which as a whole constitute a word. The address of a word, either an instruction or an operand, within the main store, is represented by the address of the first character of the word itself. According to an embodiment of the computer adapted for handling numeric characters, the main store M comprises four conventional matrix planes, each one comprising $10^5$ cores, whereby each cell comprises four cores for storing the four bits of a character. Furthermore, the main store M comprises an auxiliary conventional matrix plane comprising as well $10^5$ cores, whereby an auxiliary core is allotted to each cell, said core being adapted to store an end-of-word bit.

The presence of an end-of-word bit will be indicated by a mark under the character associated therewith.

The general instruction format is of the type FFTIIIII comprising eight characters, namely:

two operation characters F, which represent the operation to be performed upon the operand, one character T, which indicates the address of an index register whose contents is used for modifying the instruction, as is known from the United States Patent 3,012,-724, for instance; if said character is "X," no index register is selected, whereby the instruction is executed without previous modification, five characters I which represent a decimal number including five decimal digits arranged in ascending orders or denominations from the left hand. Said number represents the explicit address of the operand.

Within the explicit operand address one to five characters beginning from the character of the highest order, may be omitted.

The omitted characters are intended to be equal to the corresponding characters of the effective address of the last addressed operand. So, if the operations F1F1 and F2F2 are to be performed upon operands having the address 32479 and 32284, respectively, the two corresponding program instructions may be stored in the main store either in the form F1F1X97423F2F2X48223 or in the form F1F1X97423F2F2X482 at will.

In the computer the characters are processed serially. The operation of the computer comprises a sequence of instruction-preparation and instruction-execution phases.

During the preparation phase of an instruction, the characters of said instruction are read-out serially from the main store and interpreted. As the end-of-word bit associated with the last characters of said instruction is read-out from the main store, the execution phase of said instruction begins.

During this phase the characters of the operand are read-out serially from the main store and operated upon. As the end-of-word bit associated with the last character of the operand is read-out from the main store, the preparation phase for the next instruction begins and so on.

Each one of said phases is broken down into a variable number of elementary steps, whose sequence is controlled by a sequencing matrix MLS. The sequencing matrix MLS comprises 256 rows, each one provided with a selecting wire S1 . . . S256, respective, and 100 columns, each one provided with a read-out wire L0 . . . L99, respectively.

A bistable magnetic core is located in each one of certain cross-points of the matrix.

For example on the row S2, magnetic cores 1, 2, 3, 4, 5 and 6 are located on the column L1, L2, L7, L9, L98 and L99, respectively.

Each core is linked to the selecting wire common to all the cores of its row and to the read-out wire common to all the cores of its column.

Furthermore, all the cores of the matrix are linked to a biasing winding, not shown in the drawings, which is energized to maintain them in the "0" state.

Furthermore, some cores are linked to some condition wires, which may be selectively energized by a condition register RC. For example, the cores 1, 5 and 7 are linked to a condition wire K1, while the cores 3, 8, 4, and 5 are linked to a condition wire K2. The register RC receives from the various parts of the computer, through lines 9, condition signals which indicate that certain conditions are present at that time within said parts. Each condition signal staticized in the register RC causes a corresponding condition wire to be energized within the sequencing matrix MLS.

Some cores, as the core 5, are subject to more than one condition. Said conditions may be combined, as to their effect on the core, according to either the "or" or the "and" logical function.

It is to be noted that a signal, for example a condition signal, will be indicated by a letter symbol, and that the inverse signal, that is the signal which is present when the former is absent, will be indicated by the same symbol with an appended apex.

The rows of the MLS are selected one at a time by a selector SS controlled by a status register SR, which is adapted to store the eight-bit address of one of the 256 rows.

A clock pulse source T, having for example a constant frequency, controls the rhythm of operation of the computer.

More particularly, each clock pulse supplied to the selector SS causes the latter to send an interrogation pulse to the selecting wire of the row actually selected in the matrix MLS. Therefore, all the cores of said row which are not linked to condition wires are switched to the state "1," so as to produce a pulse on the corresponding read-out wire.

The cores linked to condition wires are switched only if all the condition wires are energized, when the conditions are combined according to the "and" function, and only if at least one condition wire is energized, when the conditions are combined according to the "or" function.

Therefore, after each interrogation pulse a set of 100 binary signals will be obtained on the read-out wires L0 . . . L99, the signal on each wire being "1" or "0" depending as to whether the corresponding core, if any, of the interrogated row, had been switched or not.

After each interrogation pulse all the cores are reset to the state "0" by the biasing winding.

The signals of the first eight columns L0 . . . L7, which are staticized in the register SR, represent the eight-bit address of the next matrix row to be selected.

The signals of the remaining columns L8 . . . L99 act as binary commands for the various parts of the computer; they are staticized in a command staticizer SC until the next clock pulse.

It is clear, therefore, that the signals obtained when interrogating a row of the matrix MLS remain staticized during the time interval between the clock pulse which produces said interrogation and the next following clock pulse. During this time interval the matrix MLS is said to be in a certain "status," whereby a certain status corresponds to each row.

The operation of the computer comprises therefore a sequence of statuses. The signals of the columns L0 . . . L7 control said sequence, whereby for a given present status, namely, for a given row actually selected, and for a given set of conditions staticized in the register RC, a single set of signals is obtained on said columns and thus a single row is selected as the next following status.

In other words, one or more future statuses correspond to each present status, and in the latter case the choice among said future statuses is determined by the conditions which actually are staticized in the register RC.

Likewise, one or more sets of commands on the columns L8 . . . L99 correspond to each status, and in the latter case the choice among said sets of commands is determined by the conditions which actually are staticized in the register RC. Each set of simultaneous commands on the columns L8 . . . L99 represents a microinstruction. During each status a certain microinstruction, as jointly determined by the present status and by the present conditions, remains staticized in the command staticizer SC.

Therefore, the operation of the computer will be controlled by a sequence of microinstructions. It is to be noted that the matrix MLS receives condition signals from the other computer parts, and supplies them with commands.

Furthermore, the computer comprises a present address register W adapted to address a cell in the main store in response to each effective address transferred thereto, said register W including five orders or denominations or character positions U (units), D (tens), C (hundreds), M (thousands) and DM (tens of thousands) for storing the five decimal digits of said effective address.

For a certain effective address stored in the register W, a single cell of the main store is addressed and selected through an address decoder AD either for reading or for writing.

A command C10 supplied to the main store M causes the contents of the actually selected cell to be read-out over a read-out line 10. A command C11 supplied to the main store M causes any character actually transmitted over an input line 11 to be written and stored in the actually selected cell.

The register W is associated with sixteen auxiliary address-registers J1 to J16 each one including five denominations corresponding to the denominations of the register W.

The register J1 is used to store the five denominations of the effective address of the next following instruction character to be addressed.

The register J2 is used to store the five denominations of the effective address of the last addressed operand. The function of the other registers J3 to J16 will not be described, as it is of no significance for the present disclosure.

An auxiliary-register selector SRA is arranged to select, under the control of commands C20, C21, C22, C23, one among the sixteen auxiliary registers for reading or writing. Each one of the sixteen combinations of said four commands causes a predetermined auxiliary register to be selected.

The contents of the presently selected auxiliary register is transferred in parallel into the register W if a command C19 opens a gate 19.

The contents of the register W is transferred in parallel to the actually selected auxiliary register if a command C29 opens a gate 29. Alternatively, if a command C30 opens a gate 30, said contents of the register W, which, as previously stated, is an address represented by a five-digit decimal number, is passed through a circuit "+1," wherein one decimal unit is added thereto, prior to being transferred to the actually selected auxiliary register.

A first operation-register RF1 receives from the main store M the first operation character of every instruction. For this purpose a command C15 opens a gate 15 at a proper time.

A second operation-register RF2 receives from the main store M the second operation character of every instruction, under the control of a command C16, which opens a gate 16.

A character register RA is used to store single characters from the main store M. A command C13, by opening a gate 13, enables a character to be transferred from the main store to the register RA; a command C18 by opening a gate 18 enables a character to be transferred from the register RA to the main store.

The character stored in the register RA may be substituted for the character stored in any denomination of any actually selected auxiliary register. More particularly, a command C24, C25, C26, C27 or C28, by opening a gate 24, 25, 26, 27 or 28, respectively, causes a denomination of the auxiliary registers to be selected for writing. Therefore, the character stored in the register RA is transferred into the denomination U, D, C, M or DM of the actually selected auxiliary register under the control of the command C24, C25, C26, C27, C28, respectively .

Furthermore, the register RA is used as a buffer storage for entering single characters from an input unit OI into the computer as well as for transferring single characters from the computer to an output unit OU.

A character counter CC provided with eight output lines P0 to P7 is advanced one step by each command C44, so as to energize said lines one at a time in sequence. The signal on each one of said lines is a condition signal for the sequencing matrix MLS, and therefore it is staticized in the register RC.

Furthermore, the computer comprises an arithmetic unit UA, which is connected to the main store M and to the register RA. As its operation is well known, it will not be described.

As an example of the mode of operation of the present computer, the preparation phase of an instruction FFXI$\underline{\text{I}}$ will now be briefly described.

At the beginning the character counter is in the position P0, as will be seen. Furthermore the matrix MLS is in the status 0, during which the staticizer SC staticizes the commands C19, which causes the contents of the actually selected auxiliary register J to be transferred to the register W, and C40, which causes a register J, as specified by commands C20, C21, C22, C23, to be selected. Furthermore, the set of commands C20, C21, C22, C23 supplied to the auxiliary register selector SRA is such as to select the register J1. Therefore in this status the following microinstruction is produced: "transfer the contents of the register J1 into the register W," that is synthetically: "J1—W."

It is to be noted that, as will be explained later, the register J1 stores the address of the first character of the aforesaid instruction to be interpreted and prepared. Furthermore, the set of signals on the lines L0 to L7 is such as to store in the status register SR the address of the row 17 of the sequencing matrix MLS as the next following row. Therefore after performing the transfer operation "J1—W," which causes the first instruction character to be addressed, at the next following clock pulse from the source T, the sequencing matrix MLS is driven into the status 17, during which it produces the commands C10, which causes the actually addressed character to be read-out from the main store, C13, which causes the character to be written into the register RA, C15, which causes a character to be written into the register RF1, C30, which causes the contents of the register W to be transferred through the "+1" circuit into the selected auxiliary register J, if any, and C40. Furthermore the commands C20, C21, C22, C23 are such as to select the register J1, as in the preceding status. Therefore the following microinstruction is produced: "read-out the character presently addressed within the main store M, and write it into both register RA and RF1; furthermore read-out its address from the register W, increase said address one unit, and copy it into the register J," that is "M—RA; M—RF1; W+1—J1."

By this way the first instruction character is copied into the first operation register RF1; furthermore the register J1 is caused to store the address of the next following character of the instruction. Furthermore the signals over the column wires L0 to L7 select as the next following status the status 30, which produces the commands C11, which causes the character actually transmitted over the input line 11, if any, to be written into the actually addressed cell of the main store, and C18, which causes the character stored in the register RA to be transferred to the actually addressed cell of the main store. The command C40 during this status is subjected to both conditions P0' and P1' according to the "and" function; that is, the core located at the 40th column of the 30th row of the sequencing matrix MLS is linked to the two corresponding condition wires. As the counter CC is in the condition P0, at present the condition wire P0' is not energized by the condition register RC. Therefore said command C40 is now inhibited, whereby no auxiliary register is selected. Therefore the following microinstruction is produced: "write into the selected cell of the main store the character stored in RA" that is "RA—M" whereby the first instruction character is "regenerated," that is, it is written in the same cell of the main store in which it was prior to reading out.

The next following status is the status 8, during which the sequencing matrix produces the commands C19, C40 and C44, which causes the character counter CC to be advanced one step.

Furthermore, the commands C20, C21, C22, C23 select the register J1, whereby the following microinstruction is produced: "J1—W; count."

The contents of the register J1 is thus transferred to the register W to address the second instruction-character, while the character counter advances one step, whereby it establishes the condition signal P1 by activating the output terminal P1.

The next following status is the status 16, wherein the sequencing matrix produces the commands C10, C13, C30, C40, all unconditioned, as well as the command C16, which causes the character actually addressed in the main store to be written into the operation register RF2 and which in the present status is conditioned by the condition signal P1, which now is present. Therefore the microinstruction "M—RA; M—RF2; W+1—J1" is produced, so that the second instruction character is written into the operation register RA, as well as into the register RF2, as second operation character. Furthermore its address increased one unit is written into the register J1, which therefore will store the address of the third instruction character.

The next following status is the status 30, during which, as in the preceding status 30, the microinstruction "RA—M" is produced. Said microinstruction causes the second character to be regenerated into the main store. The command C40 remains inhibited.

The next following status is the status 8, during which, as in the preceding status 8, the microinstruction "J1—W; count" is produced.

Therefore the third instruction character is addressed in the main store M, while the character counter advances one step, thus establishing the condition signal P2.

The next following status is the status 16, during which all the commands of the preceding status 16 are produced, except the command C16, which is at present inhibited, because the condition P1 is not present. Therefore the microinstruction "M—RA; W+1—J1" is produced, whereby the third instruction character is read-out from the main store and transferred to the register RA, while its address, increased one unit, is rewritten into the register J1, which thus will store the address of the fourth instruction-character. A decoder DA associated with the register RA recognizes the presence in said register RA of the character "X" and signals this fact by means of a condition signal DT'.

The next following status is the status 30, during which, as in the preceding status 30, the microinstruction "RA—M" is produced. Therefore said third character is regenerated in the main store M. The commands which in this status determine the future status are subjected to the conditions DT and P2. More particularly if, when the condition P2 is present, i.e. when the third instruction character is elaborated, the condition DT is also present, i.e. if said third character is not the character "X," but a true address of an index register, then beginning from the present status 30 a sequence of statuses is produced, which causes the instruction to be modified by said index register. On the contrary, in the present case, as the condition DT is not present, the next following status is the status 8, during which, like in the preceding status 8, the microinstruction "J1—W; count" is produced.

Therefore the fourth instruction-character is addressed, while the character counter advances one step, thus establishing the condition signal P3.

The next following status is the status 16, during which, as in the preceding status 16, the microinstruction "M—RA; W+1—J1" is produced.

Therefore said fourth character is read-out from the main store M and written into the register RA, while its address, increased one unit, is rewritten into the register J1, which will thus store the address of the fifth instruction character.

The next following status is the status 30, during which, in addition to the commands C11 and C18, the sequencing matrix produces the commands C40, which now is not inhibited, since both conditions P0' and P1' are present, and C24, which select the unit denomination of the presently selected auxiliary register and which now is not inhibited, since the condition P3 is present. Furthermore, the set of commands C20, C21, C22, C23, selects the register J2.

Therefore, the microinstruction "RA—M; RA—J2 units" is produced, whereby the fourth instruction-character, i.e. the first character of the explicit address, is regenerated into the main store and is written into the unit denomination U of the register J2, where it is substituted for the character previously stored therein.

The next following status is the status 8, during which, as in the preceding status 8, the microinstruction "J1—W; count" is produced.

Therefore the fifth instruction-character is addressed, while the character counter advances one step, thus establishing the condition signal P4.

The next following status is the status 16, during which, as in the preceding status 16, the microinstruction "M—RA; W+1—J1" is produced.

Therefore said fifth character is read-out from the main store M and written into the register RA, while its address, increased one unit, is rewritten into the register J1. Together with the fifth character, the end-word-bit associated therewith is read-out from the main store. Said read out bit is staticized in the flip-flop *f*A and causes the condition signal *f*A to be established.

The next following status is status 30, during which the sequencing matrix produces the commands C11, C18, C40 and C25, which selects the ten denomination D of the presently selected auxiliary register and which now is not inhibited, as the condition P4 is present.

Furthermore the commands C20, C21, C22, C23 select the register J2. Therefore the microinstruction "RA—M; RA—J2 tens" is produced, whereby the fifth instruction character, i.e. the second character of the explicit address is regenerated into the main store and is written in the ten denomination D of the register J2, where it is substituted for the character previously stored therein.

Furthermore, the conditon signal *f*A which is staticized in the staticizer RC, acts through a corresponding condition wire on the cores of the first eight columns of the line S30 of the sequencing matrix MLS, to cause the line 40 to be addressed as the next following row, instead of the line S18, as in the preceding statuses 30.

Therefore the next following status is the status 40, during which the commands C19 and C40 are produced, while the commands C20, C21, C22, C23 select the register J2. Therefore the microinstruction "J2—W" is produced, whereby the whole contents of the register J2 is transferred into the present-address register W as the effective address of the first operand character. Thus the preparation phase of the instruction stops and the execution phase begins. In said status 40 a further command "general reset" is produced, which resets the character counter to the condition P0.

It is clear therefore, that the effective address of said first operand character, that is the effective operand-address, comprises in the two lower decimal orders the two corresponding digits of the explicit address contained in the instruction, and in the remaining three orders comprises the digits which were stored in the corresponding orders of the register J2 since the end of the preparation phase of the preceding instruction.

Furthermore, as previously pointed out, in the last considered status 16 the address of the fifth instruction character, increased one unit, is written into register J1. If, therefore, the following instruction of the program is supposed to be located in a contiguous zone of the main store, the address of the next instruction is automatically obtained in the register J1.

It is obvious to those skilled in the art that in the computer according to the invention any suitable mark may be substituted for the end-of-word bit. Said mark may be for example a special character interposed between contiguous instructions.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

What we claim is:

1. A digital computer comprising in combination:

(a) storage means for storing operands, (b) means responsive to effective addresses, each one of said addresses having an ordered plurality of denominations for addressing said operands in said storage means, (c) an address register having a corresponding plurality of denominations, (d) program means for supplying instructions, each one of said instructions including for one of said operands an explicit address containing only those denominations of the effective address of said operand which differ from the corresponding denominations of the effective address of the last addressed operand and the lower order denominations, (e) means responsive to said program means for substituting the explicit address included in said supplied instruction for the previous contents of the corresponding denominations of said address register, (f) and means for transferring the contents of said address register resulting from said substitution to said first named responsive means.

2. A digital computer comprising:

(a) storage means for storing operands, (b) means responsive to effective addresses, each one of said addresses being formed of an ordered plurality of characters, for addressing said operands in said operand storage means, (c) an address register having a corresponding plurality of character positions, (d) means for storing instructions, each one of said instructions including for one of said operands an explicit address consisting of a group of contiguous characters of the effective address of said operand, said group being formed of any character of said last named effective address which differs from the corresponding character of the effective address of the last addressed operand, and of all the characters of the lower orders, the character of the highest order of said explicit address having a mark associated therewith, (e) means for reading out serially the characters of said instruction with the associated mark, (f) means fed by said read-out means for substituting each read-out character for the corresponding character within said address register, (g) and means responsive to said mark being read out for transferring the whole contents of said address register to said addressing means.

References Cited by the Examiner

UNITED STATES PATENTS

| | | | |
|---|---|---|---|
| 3,061,192 | 10/1962 | Terzian | 235—157 |
| 3,085,230 | 4/1963 | Shoultes et al. | 340—172.5 |

OTHER REFERENCES

Grabbe, Ramo, and Wooldridge: Handbook of Automation, Computation, and Control, vol. 2, pp. 2–87. (John Wiley and Sons, Inc., New York, N.Y., 1959.)

Sperry Rand Corporation: The Univac II Data Automation System, pp. 86–90, 1957.

ROBERT C. BAILEY, *Primary Examiner.*

MALCOLM A. MORRISON, *Examiner.*